United States Patent [19]

Koshimizu

[11] 4,411,476
[45] Oct. 25, 1983

[54] HYDRAULIC PRESSURE CONTROL VALVE

[75] Inventor: Naganori Koshimizu, Yokohama, Japan

[73] Assignee: Tokico Ltd., Kanagawa, Japan

[21] Appl. No.: 387,683

[22] Filed: Jun. 11, 1982

[30] Foreign Application Priority Data

Jun. 15, 1981 [JP] Japan .............................. 56-87651[U]

[51] Int. Cl.³ ............................ B60T 8/18; B60T 8/26
[52] U.S. Cl. .................................... 303/6 C; 188/349; 303/24 F
[58] Field of Search ................... 303/6 C, 24 F, 24 C, 303/24 A, 24 R, 22 R, 22 A, 84 A, 84 R, 6 R; 188/349, 345, 195

[56] References Cited

U.S. PATENT DOCUMENTS

| 3,459,000 | 8/1969 | Oberthür | 303/6 C |
| 4,026,607 | 5/1977 | Hess et al. | 303/6 C |
| 4,217,005 | 8/1980 | Takata | 303/24 F |
| 4,251,117 | 2/1981 | Kubota et al. | 303/24 F |

Primary Examiner—Douglas C. Butler
Attorney, Agent, or Firm—Wenderoth, Lind & Ponack

[57] ABSTRACT

A hydraulic pressure control valve for controlling braking pressure of two independent circuits and including two stepped pistons with the large ends being exposed respective outlet pressure and the small ends thereof being exposed to a control chamber which is connected through an inertia valve mechanism to the inlet of one circuit. The stepped pistons receive the pressure in the inlets of respective circuits at the intermediate portions thereof and incorporate therein valve mechanisms connecting normally the inlets and outlets. There are further provided a spring biased plunger retractable in receiving the pressure in the control chamber, and a stepped emergency piston with the large end being exposed to the control chamber and normally separated from the small end of the stepped piston of the other circuit. The small end of the emergency piston is exposed to the pressure of the inlet of the other circuit.

3 Claims, 3 Drawing Figures

HYDRAULIC PRESSURE CONTROL VALVE

BACKGROUND OF THE INVENTION

This invention relates to a hydraulic pressure control valve for use in hydraulic braking system of a vehicle.

The hydraulic pressure control valves in vehicle braking system control the braking pressure supplied to rear wheel brakes with respect to the braking pressure supplied to front wheel brakes thereby preventing so-called locking phenomenon on rear wheels. Usually, the hydraulic pressure control valve actuates when the inlet pressure (which usually corresponds to the pressure supplied to front wheel brakes) increases to a predetermined level (a cut-off pressure) and, thereafter, the rate of increase in the outlet pressure (which is supplied to rear wheel brakes) is decreased with respect to the inlet pressure. For changing the cut-off pressure in response to the loading condition of the vehicle, there has been proposed to provide an inertia valve which is actuated when the deceleration of the vehicle being braked exceeds a predetermined level and, thereafter, the control valve controls the pressure supplied to rear wheel brakes with respect to the pressure supplied to front wheel brakes.

When the hydraulic braking system comprises two independent circuits arranged in so-called X-piping wherein one circuit is connected to the left front wheel and the right rear wheel and the other circuit is connected to the right front wheel and the left rear wheel, there is a shortcoming that when a failure occurs in one of the circuits in which the inertia valve is provided, the control valve acts to cut off the pressure in the other circuit at a relatively low pressure, while, in such case, it is desired to increase the rear wheel braking pressure in the other circuit so as to compensate the failure in the one circuit. Such shortcoming can be solved by providing two inertia valves in respective circuits which complicates the construction and increases the size and is expensive.

SUMMARY OF THE INVENTION

An object of the invention is to overcome aforesaid shortcoming and, the hydraulic pressure control valve according to the invention comprises a housing, first and second pressure control mechanisms each of which including a stepped piston slidably disposed in a stepped bore in the housing and defining an inlet liquid chamber adapted to be connected to a source of pressure such as a master cylinder in a hydraulic braking system of a vehicle and an outlet liquid chamber adapted to be connected to a rear wheel brake of the vehicle, and a valve mechanism for opening/closing a passage provided in the piston and extending between the inlet and outlet chambers in response to the movement of the piston in the bore. Further, the pressure control valve comprises a control chamber to which one ends of respective stepped pistons being exposed thereby the pistons being biased by the hydraulic pressure in the control chamber in the direction opening the passages connecting respective inlet and outlet chambers, a plunger slidably fitted in the housing with one end thereof being exposed to the control chamber a pressure control spring acting on the other end of the plunger, and an inertia valve provided in a passage connecting the control chamber with the inlet chamber of the second pressure control mechanism. Further, according to the invention, there are provided a stepped emergency piston with one end of a large pressure receiving area being exposed to the control chamber and being adapted to abut with one end of the first stepped piston, and an emergency chamber connected to the inlet chamber of the first pressure control mechanism and being exposed to the other end of the emergency piston having a small pressure receiving area.

The inertia valve closes when the deceleration acting on the vehicle being braked exceeds a predetermined level and, thereafter, when the pressure in the inlet chambers further increases the stepped pistons displace to close the valve mechanisms and cut off the communication between the inlet and outlet chambers. The rate of the pressure rise in the outlet chambers are decreased with respect to that in the inlet chambers.

The emergency piston impedes the pressure controlling function of the valve when a failure occurs in the circuit of the second pressure control mechanism thereby assuring a desired braking force.

BRIEF DESCRIPTION OF THE DRAWINGS

Further objects and advantages of the invention will become apparent from the following description taken in conjunction with the accompanying drawings exemplifying a preferred embodiment of the invention.

In the drawings.

DETAILED DESCRIPTION OF THE PREFERRED EMBODIMENT

Figure 1:
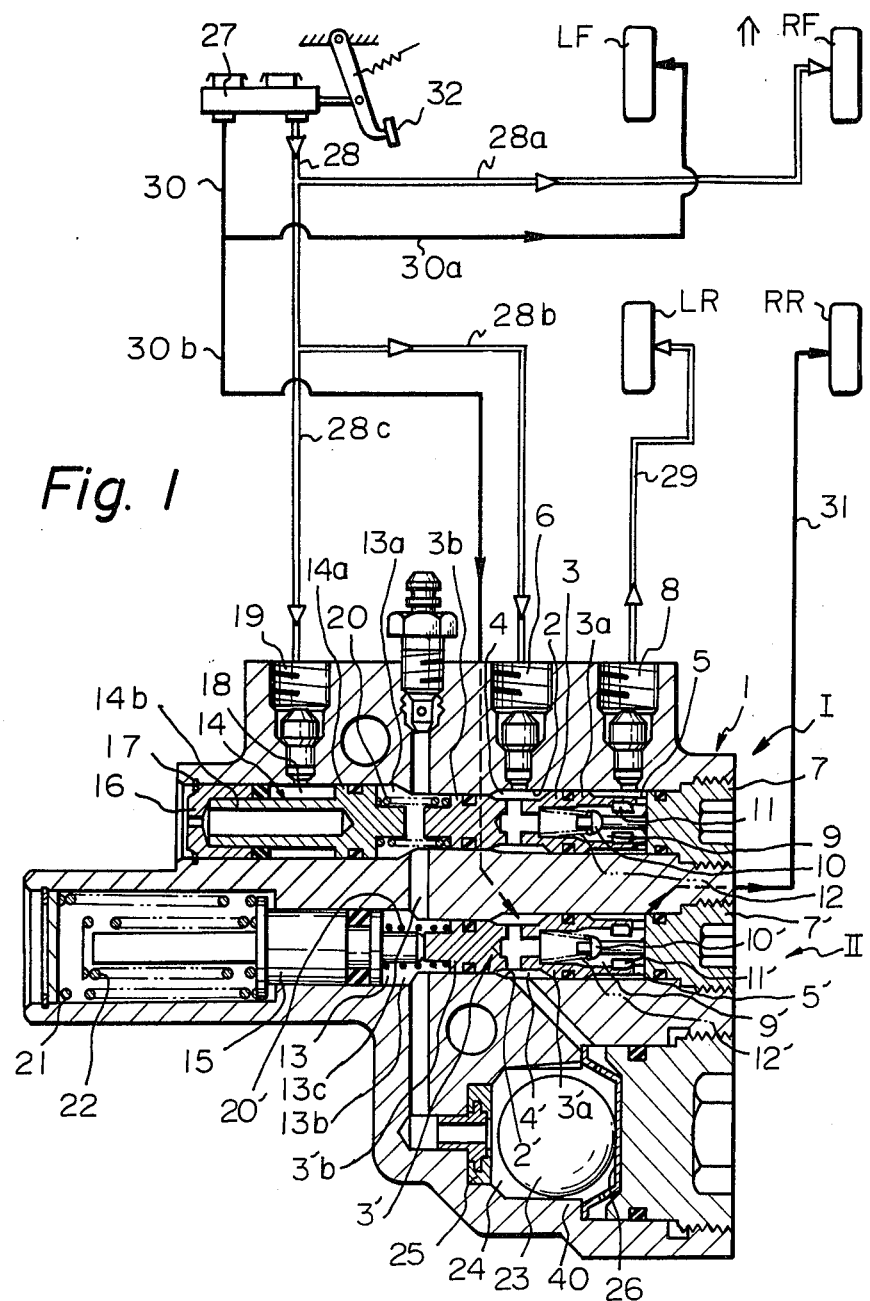
FIG. 1 is a longitudinal sectional view of a hydraulic pressure control valve according to the invention with a hydraulic braking system of a vehicle being shown schematically.
Figure 2:
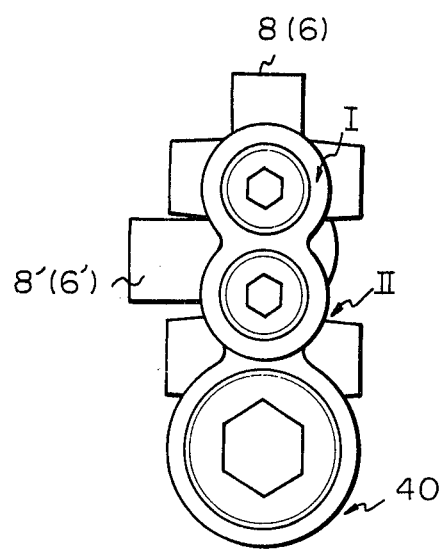
FIG. 2 is a right side view of the pressure control valve of FIG. 1.

The hydraulic pressure control valve shown in FIG. 1 comprises a housing or main body 1 receiving therein first and second pressure control mechanisms I and II.

The first pressure control mechanism I comprises a stepped piston 3 having a large diameter portion 3a and a small diameter portion 3b and being slidably received in a stepped bore 2 in the housing 1. The piston 3 defines an inlet chamber 4 and an outlet chamber 5 in the bore 2, and the inlet chamber 4 is located between the large and small diameter portions 3a and 3b of the piston 3 and opens to an inlet port 6. The outlet chamber 5 is located between the large diameter portion 3a of the piston 3 and a plug 7 closing the bore 2 and opens to an outlet port 8. Further, a connecting passage 9 is formed in the piston 3 to communicate the inlet and outlet chambers 4 and 5. A valve seat 11 is formed in the connecting passage 9 to cooperate with a valve member 10. The valve member 10 is urged by a weak spring 12 toward the valve seat 11 and toward the plug 7. Normally, the valve member 10 abuts with an elongated pillar secured to the plug 7 and is spaced from the valve seat 11. The spring 12 is supported by the piston 3.

The second pressure control mechanism II is generally identical with the first pressure control mechanism I and, therefore, corresponding parts are depicted by the same reference numerals with a prime and the description therefor is omitted.

A control chamber 13 is defined in the housing 1 to which the small diameter ends of the pistons 3 and 3' are exposed. The control chamber 13 consists of a chamber 13a formed between the piston 3 and an emergency piston 14 being coaxial with the piston 3, a chamber 13b formed between the piston 3' and a plunger 15 being coaxial with the piston 3', and a passage 13c connecting the chambers 13a and 13b and extending to an inertia valve chamber 24.

The emergency piston 14 is stepped piston having a large diameter portion 14a and a small diameter portion 14b, with the large diameter end being exposed to the chamber 13a and adapted to engage with or separate from the small diameter end of the piston 3. The small diameter portion 14b is slidable in a guide tube or sleeve 16 which is retained in the housing 1 by a retaining ring 17. An annular emergency chamber 18 is defined around the small diameter portion 14b. An inlet port 19 is connected to the emergency chamber 18. A weak spring 20 acts between the piston 3 and the emergency piston 14 to normally locating the pistons 3 and 14 separating from one another.

The plunger 15 cooperates with springs 21 and 22 to constitute a pressure control mechanism. The spring 21 has a long mounting length and acts permanently on the plunger 15 in the direction compressing the control chamber 13, and the spring 22 has a reduced mounting length and acts on the plunger 15 only when the spring 21 has been compressed by a predetermined length. The spring 22 is effective at a high load condition of the vehicle, and the spring 21 is effective at the low load condition and at the high load condition.

The control chamber 13 is connected to the inlet chamber 4' of the second pressure control mechanism II through the inertia valve chamber 24, and a spherical valve member 23 constituting a gravity ball is rotatably received in the chamber 24. The ball 23 cooperates with a valve seat 25 to connect or disconnect the communication between the control chamber 13 and the inlet chamber 4'. Normally, the ball 23 is separated by the gravity of itself from the valve seat 25. As is well known for those skilled in the art, the pressure control valve is mounted on a vehicle at an inclined attitute, alternately, inclined guide rails (not shown) are provided in the chamber 24. Incidentally, shown at 26 in FIG. 1 is an orifice plate.

The pressure control valve is connected to a hydraulic braking system of a vehicle e.g. in the following manner. One of pipings 28 extending from a tandem master cylinder 27 acting as a source of hydraulic pressure is branched into three lines 28a, 28b and 28c, with the line 28a being connected to brake cylinder RF of the right front wheel of the vehicle, the second line 28b to the inlet port 6 of the first pressure control mechanism I, and the third line 28c being connected to the inlet port 19 for the emergency chamber 18. The outlet port 8 of the first pressure control mechanism I is connected through a line 29 to the wheel cylinder(s) LR of the left rear wheel of the vehicle. Another piping 30 extending from the master cylinder 27 is branched into a line 30a connected to the left front wheel (LF) of the vehicle, and a line 30b connected to the inlet port 6' of the second pressure control mechanism II. The outlet port 8' of the control mechanism II is connected to the right rear wheel RR of the vehicle through a line 31. Incidentally, the housing 1 is mounted on the vehicle with the left side thereof as seen in FIG. 1 is directed to the forward direction of the vehicle and the longitudinal axis of the pistons 3 and 3' are inclined forwardly and upwardly.

Now, description will be made relative to respective operational modes.

TWO BRAKING CIRCUITS ARE NORMAL

When a brake pedal 32 is depressed, the master cylinder 27 generates the same pressure Pm in pipings 28 and 30 which is transmitted to the right and left front wheels RF and LF and, at the same time, to the left and right rear wheels LR and RR respectively through first and second pressure control mechanisms I and II. When the deceleration acting on the vehicle is less than a predetermined level and the gravity ball 23 does not engage with the valve seat 25, the stepped pistons 3 and 3' of the control mechanisms I and II substantially take the positions shown in FIG. 1, thus the pressure Pw supplied to rear wheels is equal to the pressure Pm in the master cylinder or the pressure in the front wheels. Incidentally, the pressure Pm prevails in inlet chambers 4 and 4', the control chamber 13 and the emergency chamber 18, and the emergency piston 14 takes the position shown in FIG. 1, but the plunger 15 retracts (moves leftward) against the spring 21.

Figure 3:
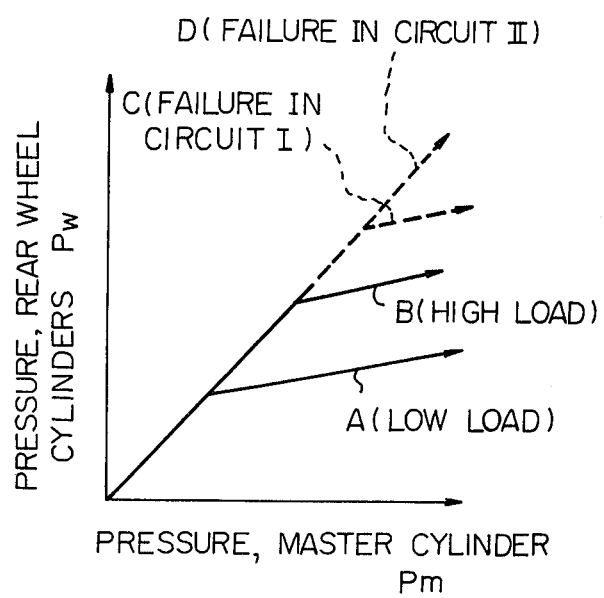
FIG. 3 is a diagram showing the relationship between the rear wheel braking pressure and the front wheel braking pressure according to the invention.

When a deceleration exceeding the predetermined level acts on the vehicle, the gravity ball 23 rollingly moves forward to engage with the valve seat 25, whereby the control chamber 13 is isolated from the inlet chamber 4'. It will be noted that the deceleration acting on the vehicle being braked depends on the braking force applied on wheels (or the hydraulic pressure applied on wheel brakes) and the loading condition of the vehicle and, therefore, the pressure in the chamber 13 when the inertia valve closes varies in accordance with the loading condition of the vehicle. Thereafter, when the pressure in the inlet chambers 4 and 4' further increases the pistons 3 and 3' move leftward against the spring force of the spring 21 or of the springs 21 and 22. At that time, the plunger 15 has been separated from the piston 3' and the liquid confined in the chamber 13 acts as a rigid body in transmitting the force. Further, in response to the leftward movement of pistons 3 and 3', the plunger 15 retracts further and the pressure in the chamber 13 somewhat increases. The emergency piston 14 maintains the most retracted position shown in FIG. 1. The valve seats 11 and 11' on the pistons 3 and 3' engage with the valve member 10 and 10' respectively to cut off the communication between inlet chambers 4 and 4' and the outlet chambers 5 and 5'. Thereafter, the valve members 10 and 10' repeatingly separate from and engage with valve seats 11 and 11' so that the pressure in the chambers 5 and 5' increases at a reduced rate with respect to the increase in the pressure Pm. FIG. 3 shows the characteristics in full lines A and B.

FAILURE IN THE FIRST CIRCUIT

When a failure occurs in the first circuit or the circuit including the first pressure control mechanism I, the pressure in the first circuit is zero and, thus, any braking force cannot be obtained from wheels RF and LR. Accordingly, the predetermined deceleration for closing the inertia valve is attained at a pressure in the second circuit which is higher than the pressure in the normal condition. The pressure supplied to wheels LF and RR in the second circuit is higher than that in the normal condition, thereby compensating the failure in the second circuit. The characteristic diagram is shown by line C in FIG. 3.

FAILURES IN THE SECOND CIRCUIT

In this case, it is not possible to expect any braking force on wheels LF and RR, and the pressure in the control chamber 13 is zero, thus, the emergency piston 14 displaces rightward to abut with the piston 3 thereby maintaining the piston 3 at the position shown in FIG. 1. The pressure supplied to the rear wheel LR is equal to that in the front wheel RF. The characteristic diagram is shown by line D in FIG. 3. It will be noted that the pressure receiving area of the piston 14 (the annular area defined by large and small diameter portions 14$a$ and 14$b$) is larger than the sectional area of the small diameter portion 3$b$ of the piston 3.

A weak spring 20 extends between the emergency piston 14 and the control piston 3 so as to normally bias the pistons at the most separated positions as shown in the drawing.

In the embodiment, the plunger 15 receives the spring force of the spring 21 and abuts with the control piston 3' in the non-actuated condition shown in the drawing, however, the plunger may be spaced from the control piston 3' in the non-actuated condition with the spring force of the spring 21 being received by the housing through a flange of the plunger 15, however, in such case it is advisable to provide a weak spring 20' similar to the spring 20.

It will be noted that the pressure in the chamber 13 somewhat increases after the closure of the inertia valve 23 and in response to the leftward movement of the pistons 3 and 3', since, at that time, the plunger 15 will also move leftward by further compressing the spring 21 (and spring 22). By determining the diameter of the plunger 15 substantially larger than that of control pistons 3 and 3', it is possible to minimize the change in the chamber 13.

As described heretofore, according to the invention, two independent braking circuits are controlled by the novel pressure control valve having a single gravity ball acting as an inertia valve mechanism, and the failure in either one of the circuits can effectively be compensated by the other circuit. Further, it is advantageous to form the control pistons 3 and 3' and related parts having complicated construction in the identical configuration.

What is claimed is:

1. A hydraulic pressure control valve comprising a housing, first and second pressure control mechanisms each including a stepped piston slidably disposed in a stepped bore in the housing and defining an inlet liquid chamber and an outlet liquid chamber in the stepped bore, each said piston having therethrough a connecting passage for connecting said two liquid chambers, each of said mechanism having a valve mechanism for closing said connecting passage in response to the displacement of the stepped piston, said pressure control valve further having a control chamber therein to which one ends of said stepped pistons being exposed with the hydraulic pressure in the control chamber biasing the stepped pistons in the direction opening the valve mechanisms, a plunger slidably fitted in the housing with one end thereof being exposed to the control chamber, a pressure control spring acting on the other end of the plunger, a stepped emergency piston with one end having a large pressure area being exposed to said control chamber and being adapted to abut with or separate from said one end of the first stepped piston, an emergency chamber connected to the inlet liquid chamber of the first pressure control mechanism and being exposed to the other end of the emergency piston having a small pressure receiving area, and an inertia valve provided in a passage connecting the control chamber with the inlet liquid chamber of the second pressure control mechanism.

2. A hydraulic pressure control valve as set forth in claim 1, wherein said first and second pressure control mechanisms have the identical construction and are received in parallel bores in the housing.

3. A hydraulic pressure control valve as set forth in claim 1, wherein the valve is incorporated in a hydraulic braking system of a vehicle with the inlet liquid chambers being connected to respective front wheel brakes and the outlet chambers to respective rear wheel brakes, and the inertia valve includes a gravity ball which closes said passage when the deceleration of the vehicle exceeds a predetermined level.

* * * * *